United States Patent [19]

Heyse et al.

[11] Patent Number: 4,478,670
[45] Date of Patent: Oct. 23, 1984

[54] PROCESS AND APPARATUS FOR FORMING A TUBE FROM A FLAT WEB

[75] Inventors: Klaus Heyse, Bad Soden; Klaüs Andrae, Zornheim, both of Fed. Rep. of Germany

[73] Assignee: Hoechst Aktiengesellschaft, Frankfurt am Main, Fed. Rep. of Germany

[21] Appl. No.: 441,226

[22] Filed: Nov. 12, 1982

[30] Foreign Application Priority Data

Nov. 20, 1981 [DE] Fed. Rep. of Germany ....... 3145967

[51] Int. Cl.³ .................. B32B 19/02; B31F 1/00; B29D 23/00; B29D 23/10
[52] U.S. Cl. ................... 156/380.1; 156/443; 156/461; 156/466; 156/200; 156/203; 493/302; 53/550
[58] Field of Search ............... 156/200, 203, 289, 443, 156/461, 468, 466, 380.1; 493/302; 53/550–552

[56] References Cited

U.S. PATENT DOCUMENTS

| 2,285,263 | 6/1942 | Fitch | 93/82 |
| 2,856,742 | 10/1958 | Ballard | 493/302 |
| 2,912,043 | 11/1959 | Bargholtz et al. | 156/466 |
| 3,066,063 | 11/1962 | Ecklund et al. | 156/461 |
| 3,593,483 | 7/1971 | Tracy | 53/551 |
| 3,912,568 | 10/1975 | Ueno et al. | 156/466 |
| 4,331,499 | 5/1982 | Madsen et al. | 156/203 |

FOREIGN PATENT DOCUMENTS

| 630355 | 7/1962 | France | 156/466 |
| 696864 | 9/1953 | United Kingdom | 156/466 |
| 881638 | 11/1961 | United Kingdom | 156/466 |
| 1509932 | 5/1978 | United Kingdom | 156/466 |

OTHER PUBLICATIONS

European Search Report.

*Primary Examiner*—Edward Kimlin
*Assistant Examiner*—Merrell Cashion
*Attorney, Agent, or Firm*—Schwartz, Jeffery, Schwaab, Mack, Blumenthal & Koch

[57] ABSTRACT

Disclosed is a process and apparatus for forming a tube from a flat web by overlapping the edge zones of the web with one another or with a flexible strip while maintaining distance between the adhering, overlapping surfaces in order to provide horizontally straight edges, and thus a circumferentially constant diameter.

18 Claims, 28 Drawing Figures

Fig. 1

PROCESS AND APPARATUS FOR FORMING A TUBE FROM A FLAT WEB

BACKGROUND OF THE INVENTION

The present invention relates to a process and apparatus for forming a tube from a flat web. More particularly, the invention relates to the production of such a tube having a uniformity in circumference.

In preparing a tube from a flat web, folding aids in the form of forming shoulders or forming heads (German Offenlegungsschrift No. 3,013,320) are conventionally used. By this process, the web is bent and folded, so that the two edges of the web approach one another and the edge zones overlap. A tube with a longitudinal seam is formed by gluing the mutually overlapping edge zones. It is also possible to join the two edge zones to one another by means of a film strip, in which case the edge zones do not necessarily have to overlap. These known folding aids have the disadvantage that it is not possible to control the width of the overlap region, and thus the circumference of the formed tube, with particular accuracy. Moreover, in the case of forming shoulders, the web material is subjected to considerable mechanical stress, resulting from the large friction forces produced as the web is deflected on the collar edge of the forming shoulder over a short path.

According to U.S. Pat. No. 2,148,884, a mandrel arranged in the interior of the formed tube is used for support, while a roller engages the outside of the tube. These folding aids do not ensure exact guiding of the overlapping edge zones of the web, so as before, there is produced a tube of varying circumference.

The forming device disclosed in U.S. Pat. No. 2,856,742 comprises two mutually opposite forming parts, each externally contacting an edge zone of the web. The two forming parts are arranged at a mutual distance from one another in the direction of the forward movement of the tube. This known forming device is unsuitable for those webs which already carry an adhesive on one edge zone, before the tube is formed. The mutually overlapping edge zones are separated from one another only in the region between the two forming parts, so that there is a risk of the edge zones already being bonded to one another before they pass the first forming part.

SUMMARY OF THE INVENTION

It is therefore an object of the present invention to provide a process and apparatus for producing a tube of constant circumference from a flat web.

It is another object of the invention to provide a process and apparatus for producing a tube from a flat web in which the edge zones of the flat web and an optionally used film strip for joining the edge zones are guided along an exactly defined path, encountering as small a degree of friction as possible, until a horizontally parallel seam is formed.

Therefore, in accordance with one aspect of the present invention, there is provided a process for forming a tube from a flat web, comprising the steps of transporting a flat web in the direction of the longitudinal axis, shaping the web into the shape of a tube by bringing the longitudinal edge zones of the web into proximity with each other, at least one of the longitudinal edges being directed along a straight line extending parallel to the direction of movement, maintaining the edge zones at a distance from each other until the zones completely overlap or are completely overlapped by a film strip contacting the edge zones with one another or with the film strip, and joining the edge zones to one another or to the film strip to form the tube. In a preferred embodiment, maintaining the distance between the edge zones and/or the film strip comprises passing the web through a forming body comprising a flexible strip.

In another aspect of the present invention, there is provided an apparatus for producing a tube from a flat web, comprising means for transporting a flat web in the direction of the longitudinal axis, means for forming a tube from the flat web comprising a flexible strip having a curved cross section adaptable to the circumference of the tube and arranged between the mutually overlapping edge zones of the web and/or between the edge zones and a filmstrip for maintaining a distance between the edge zones and/or the edge zones and the film strip, the flexible strip further having at least one radially projecting edge for guiding the edge zones along a straight line extending in the direction of forward movement.

Further objects, features and advantages of the present invention will become apparent from the detailed description of preferred embodiments which follows, when considered together with the attached figures of drawing.

BRIEF DESCRIPTION OF THE DRAWINGS

In the drawings:

FIGS. 8 to 11 illustrate further embodiments of the apparatus taken along line III—III of FIG. 2a in which the edge zones abut with one another and are covered by at least one filmstrip;

FIGS. 12 to 15. are similar to FIGS. 8 to 11 except that the edge zones herein overlap;

FIGS. 5a to 15a are cross-sectional views of the tube prepared by the apparatus of FIG. 4 and the particular embodiment of corresponding FIGS. 5 to 15.

DETAILED DESCRIPTION OF PREFERRED EMBODIMENTS

The present invention provides for the production of tubes from flat webs. The resulting tubes exhibit a uniformity in circumference previously unobtainable.

Figure 1:
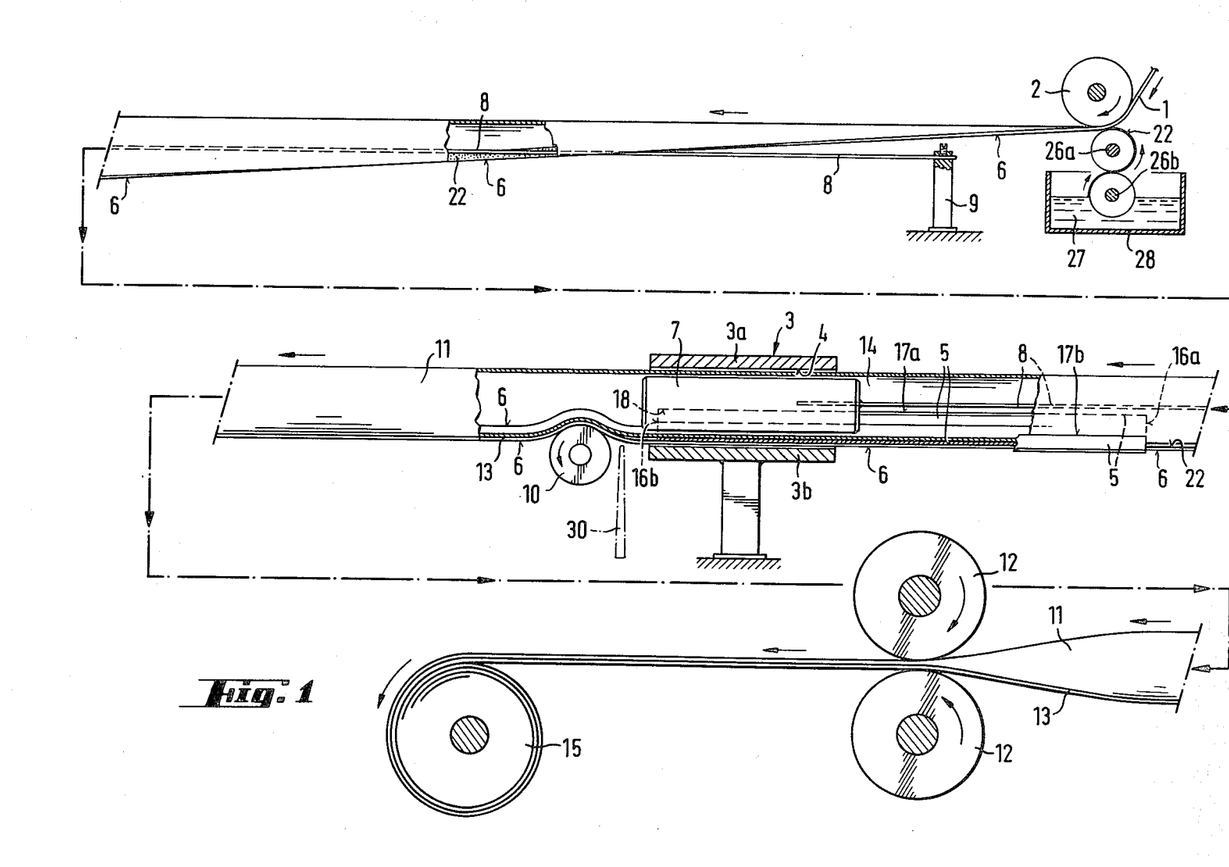
FIG. 1 is a partial section view of the apparatus of the present invention.

In FIG. 1, a flat web 1 is passed via a deflection and guide roller 2 to a forming body 3 having an internal bore 4 of circular cross section. An adhesive dispersion or solution 27 is contained in trough 28 and applied as an adhesive layer 22 in the region of one edge zone 6 of the web 1 by means of the device comprising the rollers 26a and 26b.

A flexible strip 5 is positioned between the mutually overlapping edge zones 6 of the web 1 (FIG. 3) for receiving and guiding the web through the body 3. In the region of the internal bore 4, there is a cylindrical internal mandrel 7 which is fixed via a wire 8 to a holder 9. In the interior of the forming body 3, the edge zones 6 are completely overlapped. Positioned downstream of the forming body 3 is contact roller 10 which exerts a pressure on the bonding seam so as to effectively bond the tube. The tube 11 having a glued seam 13 progresses to a driven pair of rollers 12, which transports the tube 11 and lays it flat, and is wound up on the roll 15.

In another embodiment, the rollers 26a and 26b and trough 28 are replaced by nozzle body 30. The nozzle body 30 introduces the adhesive into the overlap region of the edge zones 6, immediately upstream of the contact roller 10.

Figure 2A:
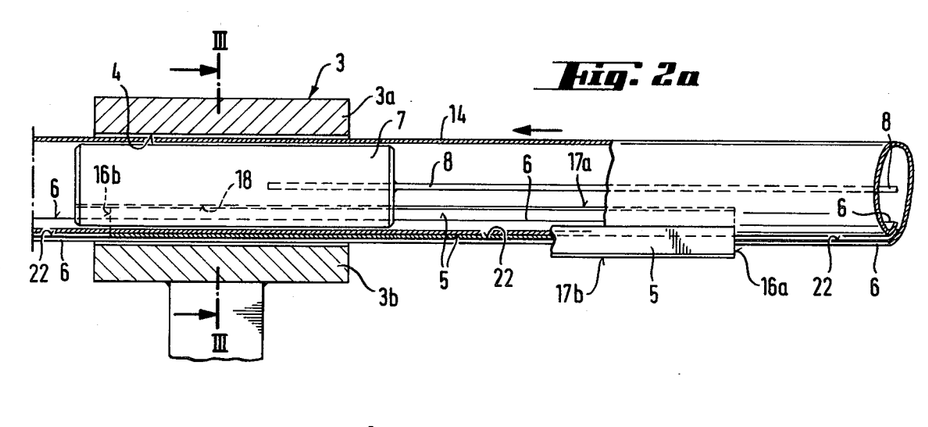
FIG. 2a is an enlarged partial representation of the tube forming section of the apparatus of FIG. 1.
Figure 2B:
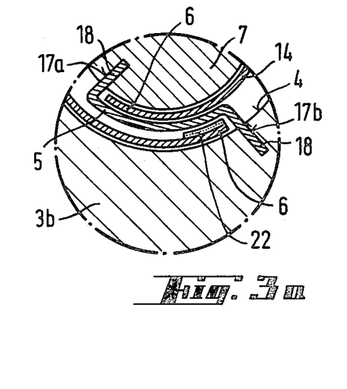
FIGS. 2b and 2c illustrate further possible arrangements of the flexible strip between the forming body and the internal mandrel.
Figure 2C:
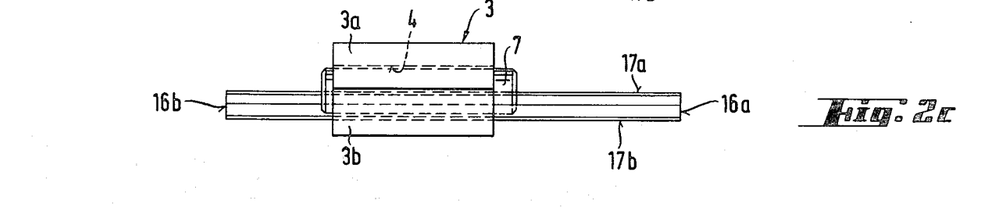
Figure 2D:
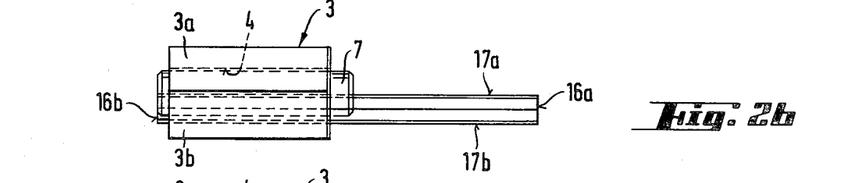
Figure 3:
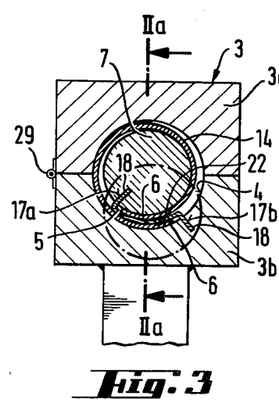
FIG. 3 is a cross-sectional view of the apparatus taken along line III—III of FIG. 2a and includes an enlarged partial representation of the flexible strip.

In FIGS. 2a, 2b 2c and 3, the forming body 3 with the internal bore 4 is shown, on an enlarged scale in some cases (FIG. 2a and FIG. 3). The bore is composed of two assembled halves 3a and 3b. In the interior of the forming body 3, there is the internal mandrel 7 fixed to the wire 8. The projecting edges 17a and 17b of the flexible strip 5 are fixed, respectively, to the internal mandrel 7 and the internal bore 4 of the forming body 3. The first end 16a of the flexible strip 5 projects from the internal bore 4 of the forming body 3 in the direction of the flat web and is located upstream of the start of the overlap region. The two edge zones 6 of the web 1, formed into a tube 14, are guided by the two projecting edges 17a and 17b of the flexible strip 5 along a straight line extending parallel to the direction of forward movement. The edges 17a and 17b are fastened in channels 18 on the circumferential surface of the internal mandrel 7 and on the surface of the internal bore. The edges zones 6 of the web 1 are held at a mutual distance by the flexible strip 5 and come into mutual contact only when the web has reached the second end 16b of the flexible strip 5. In the embodiment of FIG. 2a, the location of the second end 16b is still within the internal bore 4. It is also possible for the second end 16b to be arranged at the outlet of the internal bore 4 (FIG. 2b) or even to extend almost up to the contact roller 10 (FIG. 2c).

Figures 4, 4B, 4C:
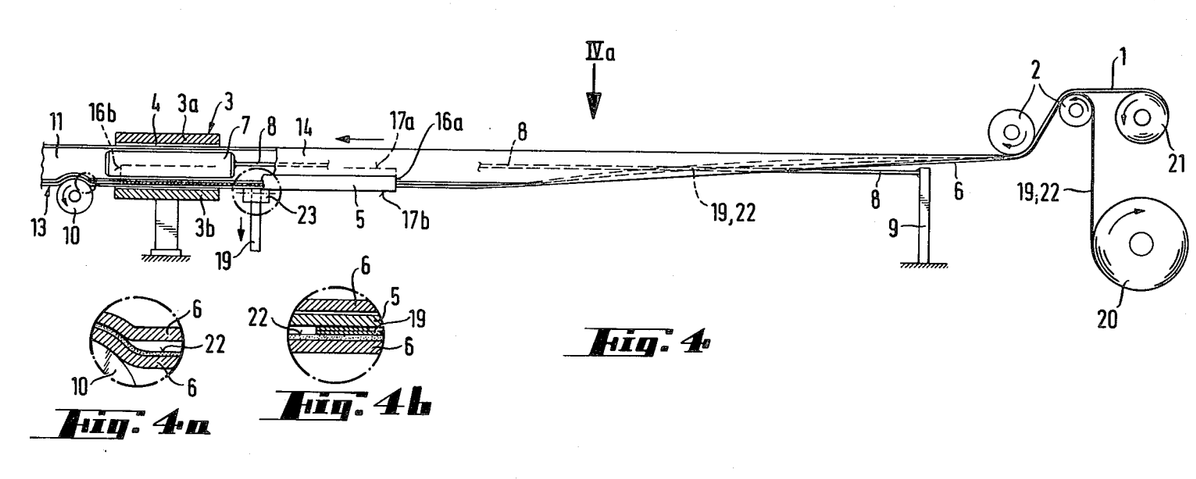
FIG. 4 represents a further embodiment of the apparatus of FIG. 1.
Figure 4A:
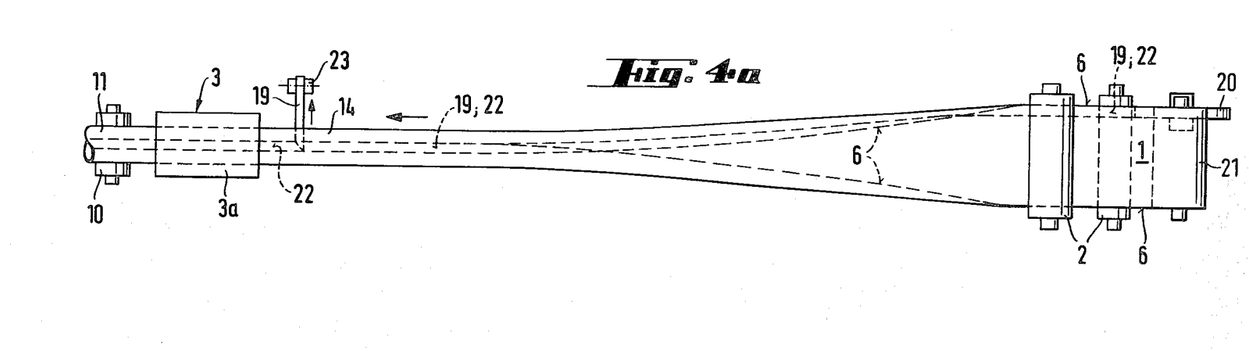
FIG. 4a represents a plan view of the equipment of FIG. 4.

In FIGS. 4 and 4a, the same reference numerals are used for the same equipment components as in the preceding figures. The web 1 is unwound from a roll 21, and a film strip 19 with an adhesive layer 22 is unwound from a roll 20, and both are guided by means of deflection rollers 2 in the direction of forward movement of the web. The adhesive layer 22 is first applied to one edge zone 6 of the web 1, and the film strip 19 serving as a protective and backing paper is then peeled off tangentially and deflected by the roller 23. The flexible strip 5 which has exactly the same cross section as in the preceding figures, prevents contact between the adhesive layer 22, from which the film strip 19 has been peeled off, and the overlapping adhesive-free edge zone of the web 1. If, in FIG. 4, a film strip is used which has adhesive on both sides, the additional backing film which is then present and covers one of the two adhesive layers, must be tangentially peeled off in an analogous manner.

Figure 5:
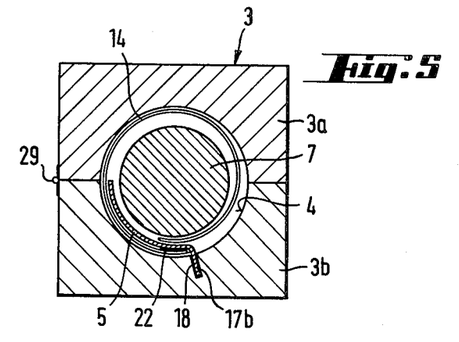
FIGS. 5, 6 and 7 illustrate further embodiments of the apparatus taken along line III—III of FIG. 2a evidencing the mutual overlapping edge zones of the web.
Figure 5A:
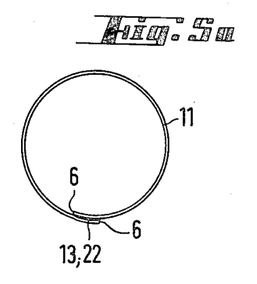

In FIG. 5, the flexible strip 5 has only one projecting edge 17b which is fixed to the internal bore 4 of the forming body 3 in a channel or groove 18. The cross section of the glued tube 11 with the glued seam 13, as shown in FIG. 5a, is also obtained with the equipment components shown in FIG. 3. Connecting the assembled body halves 3a and 3b is a hinge 29 by which the forming body 3 can be folded open.

Figure 6:
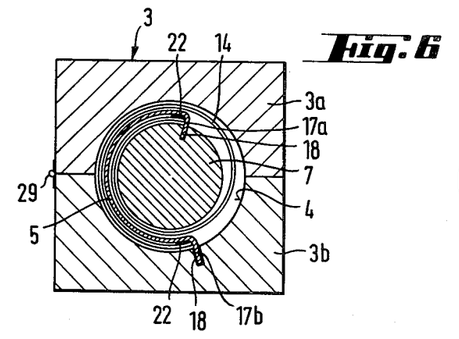
Figure 6A:
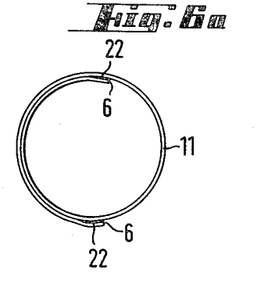
Figure 7:
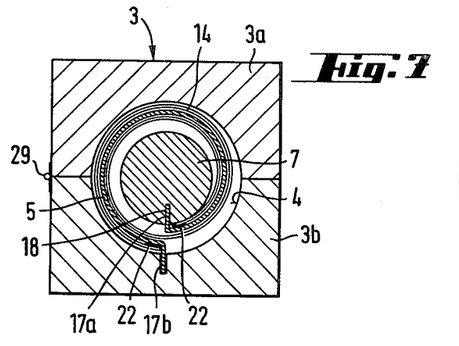
Figure 7A:
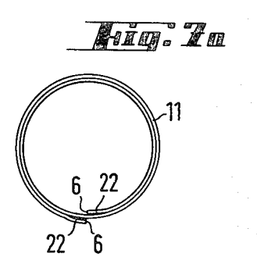

In FIGS. 6 and 7, the flexible strip 5 has two projecting edges 17a and 17b which are fixed, respectively, to the internal mandrel 7 and to the internal bore 4 of the forming body 3. Due to the relatively large width of the flexible strip 5, the resulting overlap of the edge zones of the tubes 11 shown in cross section in FIGS. 6a and 7a is more extensive when compared with the tube cross section shown in FIG. 5a.

Figures 8, 8A, 9, 9A:
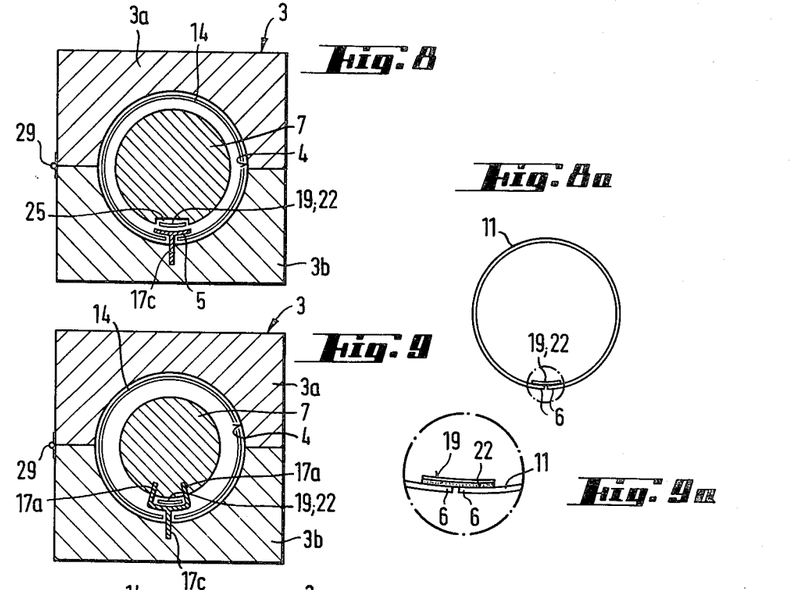

In FIG. 8, the film strip 19 is guided in a recess 25 of the internal mandrel 7.

Figure 10:
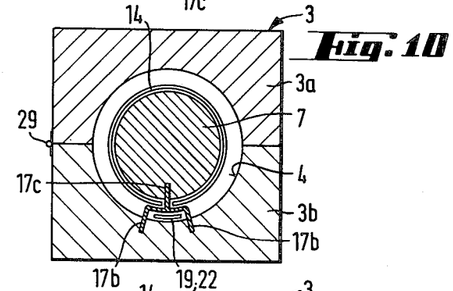
Figure 10A:
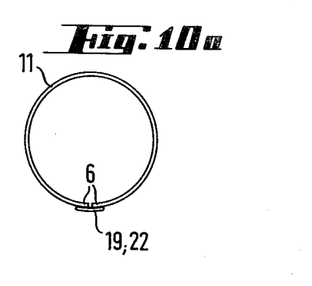
Figure 11:
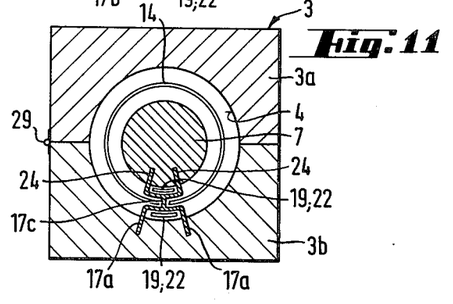
Figure 11A:
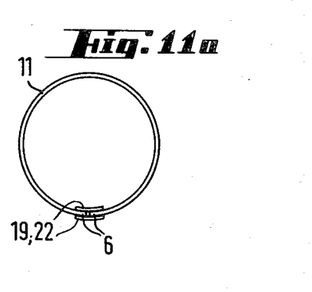

If, as in FIGS. 10 and 11 as well as 13 to 15, a film strip 19 is applied to the outside of the formed tube, a recess 25 for guiding the film strip can also be provided in the inner surface of the internal bore 4 (not shown).

In FIGS. 8 to 11, the flexible strip 5 has a first projecting edge 17c which extends along its longitudinal axis and which, in FIGS. 8 and 9, is fastened to the internal bore 4 of the forming body 3 and, in FIG. 10, to the circumferential surface of the internal mandrel 7 and, in FIG. 11, ends in a profile of U-shaped cross section, the two legs of the profile 24 being fastened to the circumferential surface of the internal mandrel 7.

In FIGS. 9 and 10, the flexible strip 5 has, on its two longitudinal edges, additionally two further projecting edges 17a and 17b which both project from the flexible strip 5 in approximately the same direction and opposite to that of the first edge 17c.

Figures 12, 12A, 12B, 13, 13A:
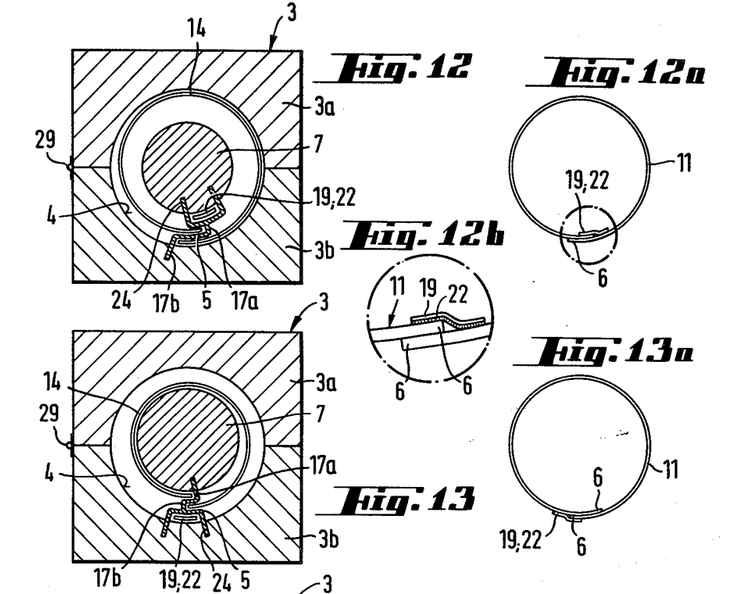
Figure 14:
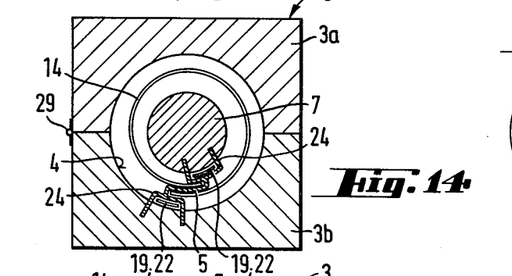
Figure 14A:
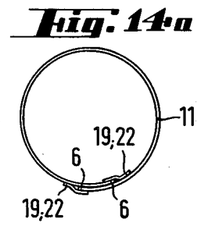
Figure 15:
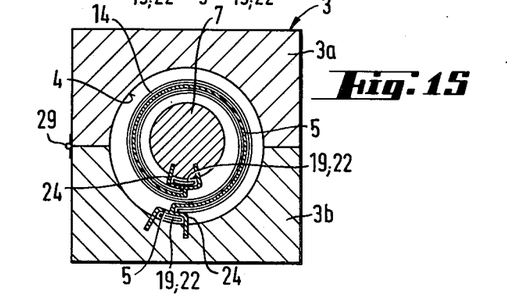
Figure 15A:
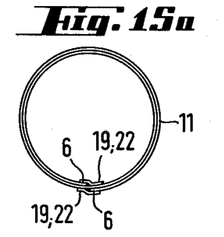

In FIGS. 12 and 13, a projecting edge 17a or 17b extending along a longitudinal edge ends, respectively, in the inner surface of the internal bore 4 or on the circumferential surface of the internal mandrel 7, the other projecting edge 17b or 17a forms a U-shaped profile 24. In FIGS. 14 and 15, both edges of the flexible strip 5 form U-shaped profiles 24.

The tubes shown in FIGS. 5a, 6a, 7a as well as 12a, 13a, 14a and 15a show overlapping edge zones 6, and the tubes of FIGS. 8a, 9a, 10a and 11a show edge zones 6 which have been brought together until they abut and joined to one another by a film strip 19 located on the inside and/or outside, covering both edge zones 6 and having an adhesive layer 22.

A flat web is to be understood as sheets, films, or rectangular blanks composed of plastic, fabrics, non-wovens or a metal, such as aluminum. In particular, the web is composed of cellulose, i.e., transparent regenerated cellulose film, regenerated cellulose or cellulose hydrate, of cellulose derivatives, such as cellulose ethers, of starch and starch derivatives or of protein materials. As is known, cellulose webs can be prepared from viscose by coagulation, from cellulose nitrate by denitration or from cellulose esters by hydrolysis. It is also possible to form a tube from webs which are reinforced with a fiber insert. For example, to prepare this web, a paper web is coated on one side or on both sides with viscose which is then converted into regenerated cellulose by coagulation. The carrier material of the film strip, preferably composed of the same material as the web, joins the two edge zones, which have been brought into abutting contact, by substantially uniformly overlapping the two edges. Film strips can be located on the outside and/or inside of the formed tube. In the case where the edge zones overlap, the film strips can additionally be located between the overlapping edges.

In the latter case, the carrier film of the film strip has an adhesive coating on both sides. If the film strip is stored on a roll, at least one of the two adhesive layers has a backing film, for example silicone paper. During the formation of the tube, the unprotected adhesive layer is bonded to one edge zone of the web, after which the backing film is peeled from the film strip. This advantageously occurs as the tube passes along the flexible strip.

It is also possible to use a film strip which has an adhesive layer on one side and a carrier film on the other, which functions as a backing film. After gluing the adhesive layer to one edge zone of the web, the carrier film is peeled from the adhesive layer. The removal of the carrier film takes place, for example, as the forming tube is passed along the flexible strip.

The backing or carrier film is preferably peeled off in the tangential direction relative to the direction of tube advancement.

The process and apparatus are particularly suitable for those webs or film strips which, before the start of the mutual overlapping of the edge zones or of the edge zones with the film strip, have an adhesive layer on one or both edge zones or on the surface of the film strip or are self-adhesive (German Offenlegungsschrift No. 3,013,320), since in these cases, the process and/or apparatus has the advantage that contact of edge zone with edge zone or of edge zones with film strips cannot occur immediately upon overlapping. The adhesive layer is applied, for example, in the form of a dispersion or solution by means of roller applicators or nozzles. It is also possible to transfer the adhesive layer by means of a carrier tape which is subsequently peeled off. Where solvents or dispersants are used for the adhesive, these liquids are removed by the action of heat before, during or after the formation of the glued seam.

It is also possible to cause incipient solution of the surface of the web and/or of the film strip in the region of the edge zones by means of suitable solvents so as to make the surfaces tacky. Further possible adhesives are thermoplastic resins which are sealable under the action of pressure and heat (U.S. Pat. No. 2,773,773), or solutions of water-soluble cationic resins which after curing form a water-insoluble glued seam (U.S. Pat. No. 2,607,696).

Advantageously, the web or the film strip also has a layer of an anchoring agent which is applied, before the application of adhesive, as an adhesion-promoting layer to one or both bonding surfaces or even to the entire surface of the web, in order to improve the adhesion between the adhesive and the bonding surfaces.

Moreover, depending on the intended use of the formed tube, the web, and if appropriate, also the film strip can have conventional coatings on the surfaces which later form the inside and outside of the tube. If, for example, the tube is used as an artificial sausage casing, means known per se for improving the ease of peeling of the tubular casing, dyes, a gas-impermeable plastic layer, water-repellant resins or imprints can be applied to the web surface(s) and/or the surface of the film strip.

The means for moving the web forward comprise conventional rollers or pairs of rollers or clips which grip the web on its two longitudinal edges and convey it in the longitudinal direction of the web and, if appropriate, also bend and fold the web. The rollers are located upstream and/or downstream of the tube-forming means according to the invention. The film strip is passed to the seam position in the direction of forward movement of the web.

The flexible strip having a curved cross-section is composed of a plastic exhibiting or coated to exhibit good slip properties relative to the web material or the adhesive layer. Due to the flexibility of the flexible strip, the curvature of the cross-section is adaptable to the circumference of the tube. It is also possible to select a width of the flexible strip so that, in conjunction with an internal bore of relatively small cross section in the forming body, a spiral cross-sectional shape of the flexible strip results. Due to its curvature, the flexible strip is relatively stiff in the longitudinal direction, as compared with the transverse direction. The flexible strip is arranged in the longitudinal direction of the web. The leading end of the strip projects out of the formed tube in the direction of the web which, at this point, is still flat, and the second end is located in the overlap region of the web edges, i.e., the strip extends into the formed tube. Directly downstream of the tube forming means are positioned means for joining the mutually overlapping edge zones of the web and for forming a glued seam. The means for forming the glued seam comprise heat-sealing stations, heating elements or contact rollers for curing the resins used as the adhesive or for pressing the edge zones against one another if, for example, a pressure-sensitive adhesive is used. The sealing means is selected and adjusted depending on the adhesive used.

If the tube is to be filled with filling material immediately after the formation of the glued seam, a filling pipe is introduced into the tube in the direction of forward movement of the web, the opening of the filling pipe being located downsteram of the means for making the glued seam. The filling material is introduced into the tube under pressure or under the action of gravity. If appropriate, a further downstream device can be provided in this case for apportioning filled sections, for example, a device for clipping or a sealing station, which seals the filled sections transversely to the direction of transport, followed by a cutting device for severing the filled sections.

The flexible strip has edges projecting along one of its two longitudinal edges, along both longitudinal edges and/or from its longitudinal axis, for guiding one or both longitudinal edges of the folded web and/or the longitudinal edge or edges of the film strip. In a preferred embodiment, the edges of the flexible strip project in the radial direction towards the tube.

In a preferred embodiment, a forming body having an internal bore of substantially circular or elliptical cross section is provided as an additional means for forming the tube in the region of the overlap of the edge zones of the web, in particular in the region of complete overlap, the tube formed being guided through the internal bore of the forming body and hence being supported on its outer surface. The cross section of the internal bore is the measure of the caliber and the shape of the tube to be produced. Advantageously, the internal bore forms a substantially circular-cylindrical cavity, however elliptical shapes are also applicable and are within the scope of the invention. For simplicity, only the term circular or circular-cylindrical is used. The wall of the internal bore is advantageously composed of a material having good sliding properties relative to the web material or to the material of the film strip, for example, polytetrafluoroethylene advantageously ensures good slip when the tube or the film strip is passed through the internal bore.

In a preferred embodiment, a substantially circular-cylindrical internal mandrel is provided in addition to the forming body with the internal bore. The internal mandrel is located in the interior of the formed tube, wherein the edge zones of the web overlap or start to overlap with one another or with the film strip, and in any case in that region of the tube where complete overlapping has occurred. If a forming body with an internal bore is used, the internal mandrel is located in the region of the internal bore or at least part of its length extends into the internal bore. The internal mandrel is advantageously in a "floating" arrangement, i.e., the mandrel can change its position in the direction transverse to the forward movement of the tube. In providing for this arrangement, one end face of the internal mandrel is fastened to one end of a rod or wire, the other end of which projects from the formed tube in the directon of the flat web and is fixed, for example, to a holder. By virtue of its material or of its thickness in the direction transverse to the forward movement of the web, the rod or wire is resilient and automatically resumes its original position after a deflection transversely to the longitudinal axis of the web. In the starting position, the longitudinal axis running through the center point of the cross section of the internal mandrel preferably coincides with the longitudinal axis of the forming body, which runs through the center point of the cross section of its internal bore.

The flexible strip is located in the annular gap, formed by the outer surface of the internal mandrel and the inner surface of the internal bore of the forming body. The flexible strip is fixed to the outer surface of the internal mandrel and/or to the inner surface of the internal bore, for example, by positioning the projecting edge or projecting edges, in a slot, a channel or a groove on the surfaces of the internal mandrel or the internal bore. It is also possible to fix the flexible strip to a holder exclusively or additionally by its first end projecting from the formed tube in the direction of the flat web.

What is claimed is:

1. An apparatus for forming a tube from a flat web, comprising:
    means for supplying a flat web comprising cellulose and having longitudinal edges;
    means for providing an adhesive material to at least one of the longitudinal edges of said flat web;
    means for forming said flat web into a tube, wherein the edges of said web abut or overlap, said forming means comprising a forming body which includes an internal bore of substantially circular cross-section, the circumference of said internal bore being equal to the outer circumference of said formed tube, said internal bore extending at least in the region whereat said tube is completely formed, for supporting the outer surface of said formed tube, and wherein said forming body further comprises a substantially cylindrical internal mandrel having a circumference which is equal to or smaller than the internal circumference of said formed tube, for supporting the inner surface of said formed tube, at least a part length of said internal mandrel being arranged in the interior of said internal bore of said forming body;
    means for guiding at least one of said longitudinal edges of said web along a straight line parallel to the direction of travel;
    means for separating said edge zones at a distance from one another during tube formation, wherein said guiding and separating means comprises a flexible strip comprising a curved cross section adaptable to the circumference of said tube and at least one radially projecting edge providing for said parallel travel of said web, said flexible strip being fixed by at least one radially projecting edge to at least either one of the inner surface of said internal bore or the circumferential surface of said internal mandrel and extending upstream of said internal bore and said internal mandrel, for engaging said web as said tube is formed;
    means for contacting said edge zones with each other; and
    means for joining said edge zones to form said tube.

2. An apparatus as defined in claim 1, wherein said flexible strip comprises on each of its two longitudinal edges an edge projecting in mutually opposite radial directions and having one edge fixed in said internal bore and the other edge fixed in said internal mandrel.

3. An apparatus as defined in claim 1, wherein at least one of said projecting edges is U-shaped and the other edge extends in a radially opposite direction.

4. An apparatus as claimed in claim 1, wherein said flexible strip comprises at least two radially projecting edges, one of said edges fixing said strip to said internal bore and another of said edges fixing said strip to said internal mandrel.

5. An apparatus as claimed in claim 1, wherein said flexible strip comprises a portion with a curved cross-section and a radially projecting edge which extends into and fixes said strip to said internal bore.

6. An apparatus as claimed in claim 5, wherein said portion extends approximately one-fourth of the distance around the circumference of the formed tube.

7. An apparatus as claimed in claim 5, wherein said flexible strip comprises a T-shaped cross-section wherein the leg of said T-shape extends radially into and fixes said strip to said internal bore.

8. An apparatus as claimed in claim 4, wherein said flexible strip comprises a first radially projecting edge extending into said internal bore and a second radially projecting edge extending into said internal mandrel, said first and second edges being connected by a portion with a curved cross-section adapted to the circumference of said tube.

9. An apparatus as claimed in claim 8, wherein said portion extends approximately one-half of the distance around said circumference of said tube.

10. An apparatus as claimed in claim 8, wherein said portion extends approximately around the entire circumference of said tube.

11. An apparatus as claimed in claim 4, wherein said flexible strip comprises a U-shape having a radially projecting edge extending from the base of said U-shape.

12. An apparatus as claimed in claim 11, wherein said radially projecting edge extending from the base of said U-shape extends into said internal bore and the radially projecting edges comprising said U-shape extend into said internal mandrel.

13. An apparatus as claimed in claim 11, wherein said radially projecting edge extending from the base of said U-shape extends into said internal mandrel and the radially projecting edges comprising said U-shape extend into said internal bore.

14. An apparatus as claimed in claim 11, wherein said radially projecting edge extending from the base of said U-shape is shaped to overlap the longitudinal edges of said web.

15. An apparatus as claimed in claim 4, wherein said flexible strip comprises two U-shaped projections, one of said projections extending into said internal bore and the other of said projections extending into said internal mandrel.

16. An apparatus as claimed in claim 15, further including a portion with a curved cross-section connecting U-shape projections.

17. An apparatus as claimed in claim 16, wherein said portion extends around the circumference of said tube a distance sufficient to offset said U-shape projections.

18. An apparatus as claimed in claim 16, wherein said portion extends around approximately the entire distance of the circumference of said tube.

* * * * *